United States Patent
Nada (10) Patent No.: US 10,498,286 B2
(45) Date of Patent: Dec. 3, 2019

(54) TRUCK AND METHOD OF CONTROLLING ELECTRIC DRIVE MOTOR FOR DRIVING MOUNTED ON TRUCK

(71) Applicant: TOYOTA JIDOSHA KABUSHIKI KAISHA, Toyota-shi, Aichi-ken (JP)

(72) Inventor: Mitsuhiro Nada, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 16/017,183

(22) Filed: Jun. 25, 2018

(65) Prior Publication Data
US 2019/0006981 A1    Jan. 3, 2019

(30) Foreign Application Priority Data
Jun. 28, 2017    (JP) ................ 2017-125997

(51) Int. Cl.
*H02P 6/00*    (2016.01)
*H02P 29/68*    (2016.01)
*B60L 15/20*    (2006.01)
*H02P 27/06*    (2006.01)

(52) U.S. Cl.
CPC .............. *H02P 29/68* (2016.02); *B60L 15/20* (2013.01); *H02P 27/06* (2013.01); *B60L 2250/28* (2013.01)

(58) Field of Classification Search
CPC ..... H02P 27/06; H02P 29/68; B60W 2540/10; B60W 10/08
See application file for complete search history.

(56) References Cited

U.S. PATENT DOCUMENTS

2010/0272871 A1* 10/2010 Wang ................. A21D 10/04
426/296

FOREIGN PATENT DOCUMENTS

JP    2009-303283    12/2009

* cited by examiner

*Primary Examiner* — Karen Masih
(74) *Attorney, Agent, or Firm* — Finnegan, Henderson, Farabow, Garrett & Dunner, LLP (57) ABSTRACT

When the rotation speed is zero, the current value is specified to monotonically increase with an increase in depression amount of an accelerator pedal in a range of a depression amount from 0% to a predetermined amount P2. The current value is fixed to a limit value Ith irrespective of the depression amount in a range of the depression amount from the predetermined amount P2 to 100%.

12 Claims, 8 Drawing Sheets

TRUCK AND METHOD OF CONTROLLING ELECTRIC DRIVE MOTOR FOR DRIVING MOUNTED ON TRUCK

CROSS-REFERENCE TO RELATED APPLICATIONS

The present application claims priority from Japanese patent application 2017-125997 filed on Jun. 28, 2017, the entirety of the content of which is hereby incorporated by reference into this application.

BACKGROUND

The present disclosure relates to an electric motor-driven truck.

JP 2009-303283A discloses a technique of measuring a phase current flowing in a three-phase alternative current motor and calculating a voltage command by feedback control. An inverter is used to drive the electric motor. The inverter switches on and off a plurality of switching elements based on a pulse width modulation control signal from a PWM converter and applies a DC power in the form of a three-phase AC power to the electric motor. Each of the plurality of switching elements allows the current to flow and shuts off the current in synchronism with rotation of the electric motor.

In general, allowing the current to flow in the electric motor rotates the electric motor and accordingly does not cause the current to continuously flow in any of the plurality of switching elements. In the state of torque insufficiency, however, allowing the current to flow in the electric motor fails to rotate the electric motor. In this case, the current continuously flows in one of the plurality of switching elements. The continuous flow of current raises the temperature of the switching element. The switching element has a failure at the excessively high temperature.

In general to prevent such a failure, the temperature of the switching element is measured and the current value flowing in the electric motor is forcibly set to zero when the measurement value exceeds a threshold value. Forcibly setting the current value to zero the torque becomes zero. Accordingly, it is preferable to avoid such a forcible control whenever possible.

In order to avoid such a forcible control, a possible procedure measures the temperature of the switching element and performs feedback control to prevent the measurement value from exceeding the threshold value. Such feedback control, however, has a limitation in response speed. Additionally, the switching element is a small component and has a small heat capacity. Accordingly, the temperature of the switching element is likely to exceed the threshold value, prior to activation of the feedback control.

In order to ensure normal activation of the above feedback control, it is preferable to estimate the torque level that is likely to cause a torque insufficiency. For example, in the case of an electric motor mounted on the vehicle for driving, the torque insufficiency may occur when the vehicle rides over a large bump or when the vehicle starts on an uphill. These phenomena are affected by the vehicle weight. In the case of, for example, a passenger vehicle having a small variation in vehicle weight, the value of vehicle weight is regarded as a fixed value and is used for feedback control to prevent the temperature of the switching element from exceeding the threshold value.

A truck, on the other hand, has a significantly larger variation in vehicle weight than that of the passenger vehicle. Accordingly, it is impractical to regard the vehicle weight as a fixed value. The above feedback control may be implemented by measuring or estimating the vehicle weight. Such measurement or estimation, however, needs time and labor or needs complicated calculations and is thus unpreferable.

By taking into account the foregoing, an object is to avoid overheating of a switching element in an electric motor-driven truck by a simple technique.

SUMMARY

A first aspect of the present disclosure provides a truck. The truck of the first aspect comprises an electric drive motor for driving; an inverter including a plurality of switching elements configured to apply alternating current flow into the electric drive motor; an accelerator pedal configured to control a current value flowing into the electric drive motor; and a control unit configured to control a current value flowing into the inverter according to a depression amount of the accelerator pedal and a rotation speed of the electric drive motor. When the rotation speed of the electric drive motor is zero, the control unit controls the current value flowing into the inverter to be equal to or lower than a limit value obtained by multiplying a predetermined maximum value by a predetermined ratio that is any value in a range of not lower than 50% and lower than 100%. When the rotation speed of the electric drive motor is zero, the truck of the first aspect controls the current value flowing into the inverter to be equal to or lower than the limit value. This avoids overheating of the switching element. This configuration does not need the value of vehicle weight and thus readily implements the control.

A second aspect of the present disclosure provides a truck. The truck of the second aspect comprises a electric drive motor for driving; an inverter including a plurality of switching elements configured to apply alternating current flow into the electric drive motor; an accelerator pedal configured to control a current value flowing into the electric drive motor; and a control unit configured to control a current value flowing into the inverter according to a depression amount of the accelerator pedal and a rotation speed of the electric drive motor. When the depression amount is 100%, the control unit controls the current value to a predetermined maximum value when the rotation speed is equal to a first rotation speed that is lower than zero or when the rotation speed is equal to a second rotation speed that is higher than zero, while controlling the current value to a limit value obtained by multiplying the predetermined maximum value by a predetermined ratio that is any value in a range of not lower than 50% and lower than 100% when the rotation speed is equal to zero. At the depression amount of 100%, the truck of the second aspect controls the current value flowing into the inverter to the limit value when the rotation speed of the electric drive motor is zero, unlike the case where the rotation speed is not zero. This avoids overheating of the switching element. This configuration does not need the value of vehicle weight and thus readily implements the control.

In the truck of the first and second aspects, the control unit may set the predetermined ratio to a first value when temperature of the switching element is a first temperature, while setting the predetermined ratio to a second value that is larger than the first value when the temperature of the switching element is a second temperature that is lower than the first temperature. The truck of this aspect employs the limit value that is determined according to the temperature of the switching element, while avoiding overheating of the switching element.

In the truck of the first and second aspects, when the rotation speed is zero, the control unit may cause the current value to be equal to the limit value when the depression amount is equal to or larger than a predetermined amount. The truck of this aspect limits the current value to be equal to or lower than the limit value by the simple technique.

A third aspect of the present disclosure provides a truck. The truck of the third aspect comprises a electric drive motor for driving; an inverter including a plurality of switching elements configured to apply alternating current flow into the electric drive motor; an accelerator pedal configured to control a current value flowing into the electric drive motor; and a control unit configured to control a current value flowing into the inverter according to a depression amount of the accelerator pedal and a rotation speed of the electric drive motor. When the rotation speed is zero, the control unit controls the current value to a first value when the depression amount is equal to a first amount, while controlling the current value to a second value that is larger than the first value when the depression amount is equal to a second amount that is larger than the first amount or when the depression amount is equal to a third amount that is larger than the second amount. The truck of this aspect does not change the current value even when the depression amount is increased from the second amount to the third amount. This avoids overheating of the switching element. This configuration does not need the value of vehicle weight and thus readily implements the control.

DESCRIPTION OF EMBODIMENTS

Figure 1:
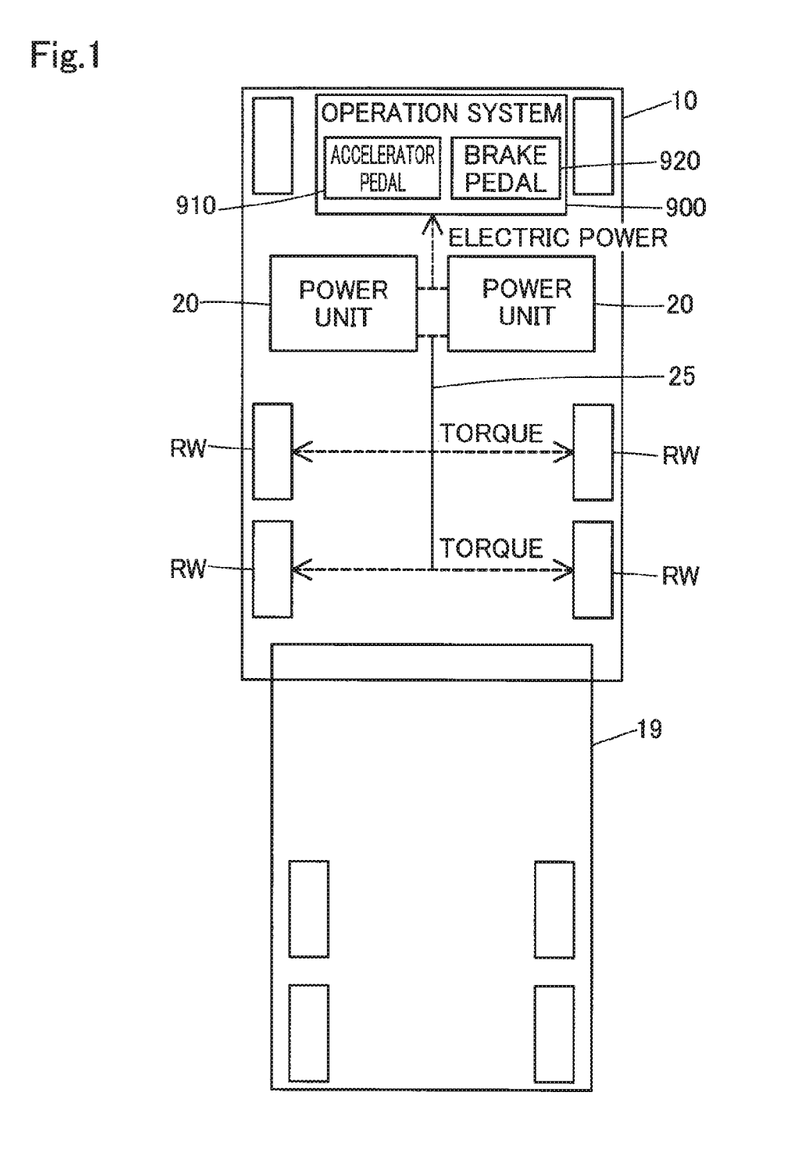
FIG. 1 is a diagram illustrating a truck.

The following describes Embodiment 1. FIG. 1 illustrates a truck 10. The truck 10 is configured to pull a trailer 19. The truck 10 includes two power units 20, a propeller shaft 25, and an operation system 900. Each of the power units 20 serves to generate power by a fuel cell as described later.

The operation system 900 collectively designates devices operated by a driver for driving. The operation system 900 includes, for example, an accelerator pedal 910, a brake pedal 920, and a steering wheel (not shown). Each of the two power units 20 supplies electric power to the operation system 900. Torques generated by the two power units 20 are transmitted via one propeller shaft 25 to four rear wheels RW.

Figure 2:
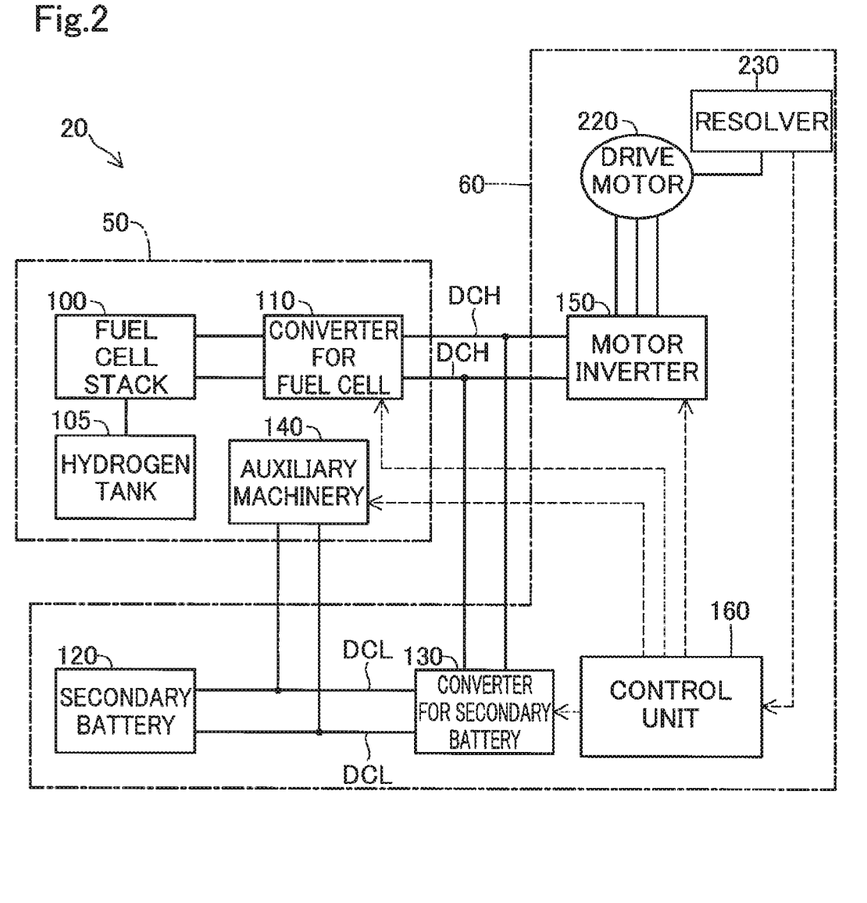
FIG. 2 is a block diagram illustrating the configuration of a power unit.

FIG. 2 is a block diagram illustrating the configuration of the power unit 20. The power unit 20 includes a fuel cell module 50 and an electric system 60. The fuel cell module 50 includes a fuel cell stack 100, a hydrogen tank 105, a converter for the fuel cell 110 and auxiliary machinery 140. The electric system 60 includes a secondary battery 120, a converter for the secondary battery 130, a motor inverter 150, a control unit 160, an electric drive motor 220 and a resolver 230.

The hydrogen tank 105 stores hydrogen for supply to the fuel cell stack 100. The fuel cell stack 100 is electrically connected with the converter for the fuel cell 110. The converter for the fuel cell 110 performs a boost operation to boost an output voltage of the fuel cell stack 100 to a target voltage. The converter for the fuel cell 110 is electrically connected with the motor inverter 150 via high-voltage direct current lines DCH.

The secondary battery 120 is a lithium titanium battery. The secondary battery 120 is electrically connected with the converter for the secondary battery 130 via low-voltage direct current lines DCL. The secondary battery 120 is configured to include a plurality of cells stacked in series.

The converter for the secondary battery 130 is electrically connected with the converter for the fuel cell 110 and the motor inverter 150 via the high-voltage direct current lines DCH. The converter for the secondary battery 130 regulates the voltage in the high-voltage direct current lines DCH as an input voltage of the motor inverter 150 and controls charging and discharging of the secondary battery 120.

When the output electric power from the converter for the fuel cell 110 is insufficient relative to a target output electric power, the converter for the secondary battery 130 causes electric power supply from the secondary battery 120. The state that the output electric power from the converter for the fuel cell 110 is insufficient relative to the target output electric power is called transient state according to the embodiment.

When regenerative electric power is generated by the electric drive motor 220, the converter for the secondary battery 130 converts the regenerative electric power and outputs the regenerative electric power to the low-voltage direct current lines DCL-side The converter for the secondary battery 130 also may convert an output electric power of the fuel cell stack 100 and output the electric power to the low-voltage direct current lines DCL-side. Using the converted electric power, the control unit 160 is able to perform control of increasing SOC of the secondary battery 120 when the electric power outputtable from the converter for the fuel cell 110 is greater than the target output electric power.

The auxiliary machinery 140 collectively designate auxiliary machines used for operation of the fuel cell stack 100. The auxiliary machinery 140 includes, for example, an air compressor, a hydrogen circulation pump and a water pump. The auxiliary machinery 140 is electrically connected with the low-voltage direct current lines DCL or with the high-voltage direct current lines DCH.

The motor inverter 150 converts DC power supplied via the high-voltage DC wiring DCH into three-phase AC power. The motor inverter 150 is electrically connected with the electric drive motor 220 and supplies the three-phase alternating current electric power to the electric drive motor 220. The motor inverter 150 also converts the regenerative electric power generated in the electric drive motor 220 into a direct current electric power and outputs the direct current electric power to the high-voltage direct current lines DCH.

The resolver 230 is configured to detect a rotational angle of a rotor included in the electric drive motor 220 and enter a detection result to the control unit 160.

The control unit 160 is configured by a plurality of ECUs. The control unit 160 controls the operations of the respective components of the power unit 20, in addition to the control described above. For example, the control unit 160 controls the converter for the fuel cell 110 and the converter for the secondary battery 130, so as to control the current value flowing in the motor inverter 150. The current value flowing in the motor inverter 150 is controlled, with a view to controlling the current value flowing in the electric drive motor 220 and thereby controlling the torque generated by the electric drive motor 220.

Figure 3:
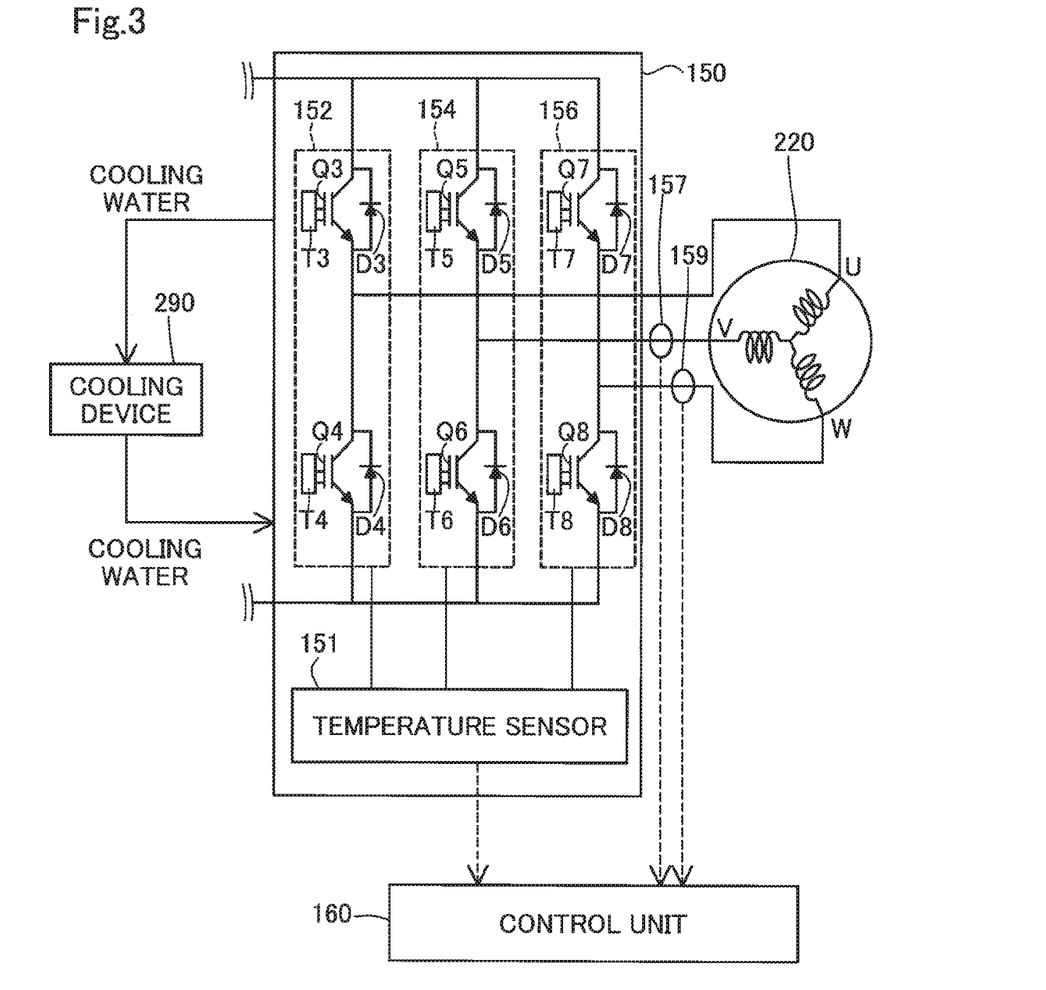
FIG. 3 is a diagram illustrating part of the internal configuration of a motor inverter.

FIG. 3 illustrates part of the internal configuration of the motor inverter 150. The motor inverter 150 is comprised of a U-phase arm 152, a V-phase arm 154 and a W-phase arm 156. The U-phase arm 152, the V-phase arm 154 and the W-phase arm 156 are connected in parallel to one another.

The U-phase arm 152 includes a switching element Q3, a switching element Q4, a diode element D3, and a diode element D4. The switching element Q3 and the switching element Q4 are connected in series. The diode element D3 is connected between a collector and an emitter of the switching element Q3 such that the current flows from the emitter side to the collector side. The diode element D4 is connected between a collector and an emitter of the switching element Q4 such that the current flows from the emitter side to the collector side.

The V-phase arm 154 includes a switching element Q5, a switching element Q6, a diode element D5, and a diode element D6. The switching element Q5 and the switching element Q6 are connected in series. The diode element D5 is connected between a collector and an emitter of the switching element Q5 such that the current flows from the emitter side to the collector side. The diode element D6 is connected between a collector and an emitter of the switching element Q6 such that the current flows from the emitter side to the collector side.

The W-phase arm 156 includes a switching element Q7, a switching element Q8, a diode element D7 and a diode element D8. The switching element Q7 and the switching element Q8 are connected in series. The diode element D7 is connected between a collector and an emitter of the switching element Q7 such that the current flows from the emitter side to the collector side. The diode element D8 is connected between a collector and an emitter of the switching element Q8 such that the current flows from the emitter side to the collector side.

An IGBT (insulated gate bipolar transmitter) is employed for each of the switching elements Q3 to Q8 according to the embodiment. Drive circuits T3 to T8 are respectively connected with the switching elements Q3 to Q8 to switch over between ON and OFF.

A middle point between the switching element Q3 and the switching element Q4 is connected with one end of a U-phase coil of the electric drive motor 220. A middle point between the switching element Q5 and the switching element Q6 is connected with one end of a V-phase coil of the electric drive motor 220. A middle point between the switching element Q7 and the switching element Q8 is connected with one end of a W-phase coil of the electric drive motor 220. The other end of the U-phase coil, the other end of the V-phase coil and the other end of the W-phase coil are connected at a middle point in the electric drive motor 220.

A current sensor 157 is provided on a line connecting the V-phase arm 154 with the V-phase coil. A current sensor 159 is provided on a line connecting the W-phase arm 156 with the W-phase coil. The current sensor 157 and the current sensor 159 are configured to measure the currents flowing in the electric drive motor 220 and output the measurement results to the control unit 160.

A temperature sensor 151 is provided to measure the respective temperatures of the switching elements Q3 to Q8. More specifically, the temperature sensor 151 is comprised of six temperature sensing diodes. The six temperature sensing diodes are respectively built in the switching elements Q3 to Q8. As a matter of convenience, FIG. 3 illustrates the temperature sensor 151 as one functional block. The measurement values of the temperature sensor 151 are input into the control unit 160.

A cooling device 290 is provided as shown in FIG. 3. The cooling device 290 is configured to cool down the switching elements Q3 to Q8 by using circulation of cooling water.

Figure 4:
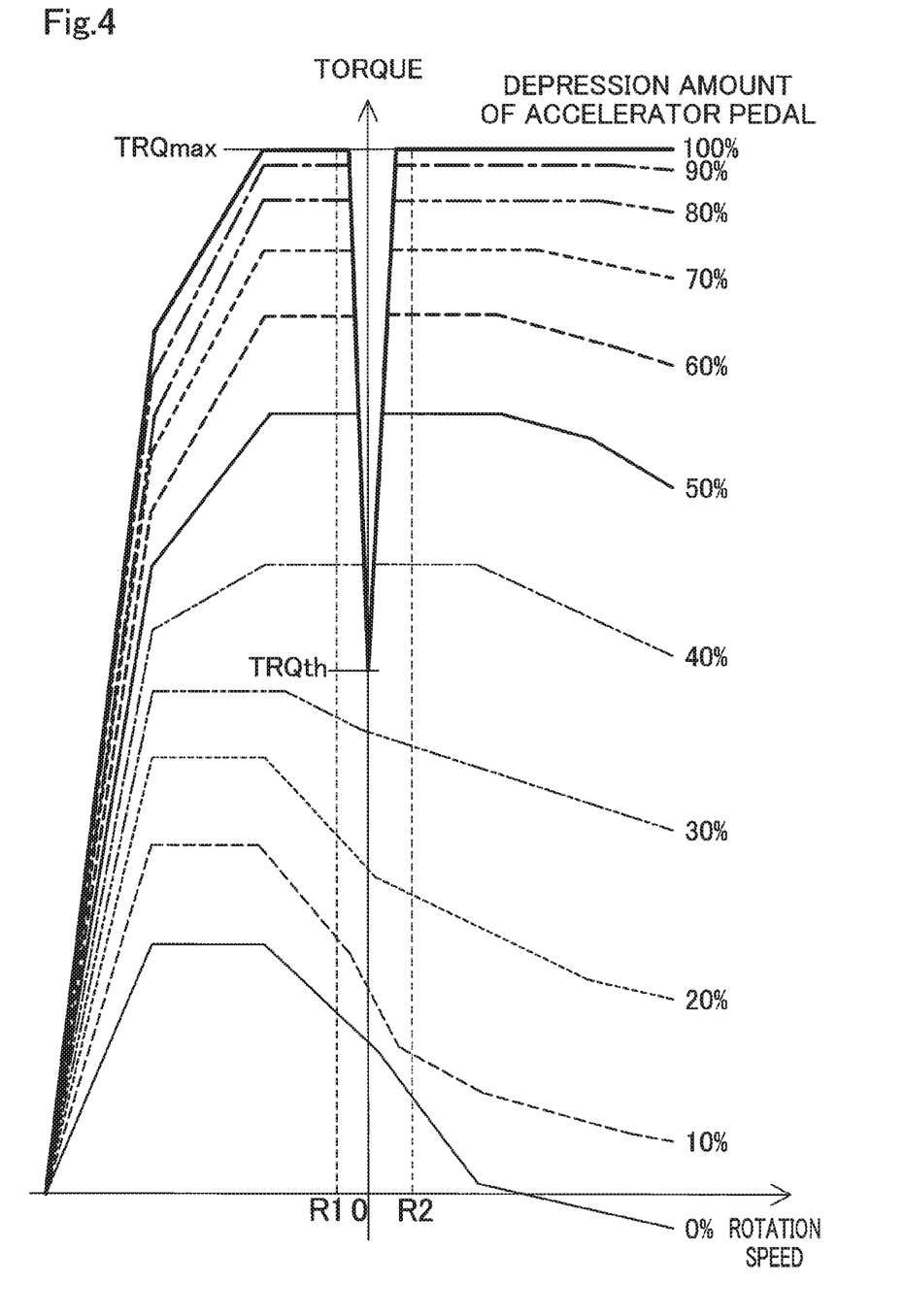
FIG. 4 is a graph showing relationships of torque to rotation speed.

FIG. 4 is a graph showing relationships of torque to rotation speed with regard to respective depression amounts of the accelerator pedal 910. In the description of this embodiment below, the depression amount means the depression amount of the accelerator pedal 910, the torque means the torque generated by the electric drive motor 220, and the rotation speed means the rotation speed of the electric drive motor 220. The control unit 160 stores these relationships in the form of a map. The control unit 160 controls the electric drive motor 220 via the motor inverter 150, based on these relationships.

FIG. 4 shows an extract of the relationships only at the near zero rotation speed. The relationships of torque to rotation speed are, however, actually specified at the higher rotation speed as well. As shown in FIG. 4, the relationships of torque to rotation speed are also specified at the negative rotation speed. The relationships at the negative rotation speed are not applied to reverse driving at the time of parking or the like but are applied to the situation that the vehicle rolls backward at the time of a hill start or the like. In spite of the negative rotation speed, the positive torque generates a driving force in a direction of moving the truck 10 forward.

The depression amount is shown at the interval of 10% in the graph of FIG. 4 but is actually specified at a narrower interval than 10%. As shown in FIG. 4, at each of the depression amounts of 40% to 100%, when the rotation speed increases from a first rotation speed R1 (<0 rpm) and approaches zero, the torque starts abruptly decreasing at each predetermined rotation speed. When the rotation speed increases from zero, the torque abruptly increases. In spite of a further increase in rotation speed, the torque is kept unchanged after each predetermined rotation speed. The rotation speed then reaches a second rotation speed R2.

Figure 5:
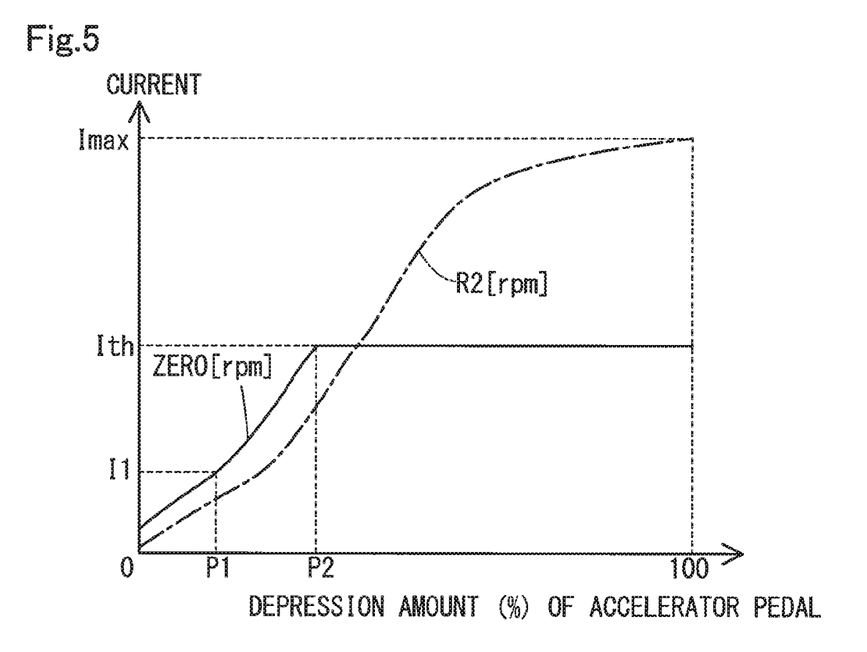
FIG. 5 is a graph showing relationships of current value to a depression amount of an accelerator pedal.

As described above, the torque reaches a minimum value at the rotation speed of zero with regard to the depression amount of 40% to 100%. According to the embodiment, the torque is specified to reach its minimum value at the rotation speed of zero with regard to the depression amount equal to or larger than a predetermined amount P2 (for example, 33%). The predetermined amount P2 is shown in FIG. 5.

When the depression amount is equal to or larger than the predetermined amount P2, an identical value of torque is generated at the rotation speed of zero irrespective of the depression amount. This identical value is equal to the minimum value described above. This minimum value is shown as torque TRQth in FIG. 4.

According to the embodiment, a torque TRQmax shown in FIG. 4 is a value designed as a maximum torque of the electric drive motor 220. The torque TRQmax is output at the rotation speed in a predetermined range when the depression amount is equal to 100%. The rotation speed in the predetermined range denotes the rotation speed in a range of approximately not lower than −200 rpm and not higher than 1000 rpm, except the near zero rotation speed as described above. The first rotation speed R1 is a value that is higher than −200 rpm and that is lower than zero. The second rotation speed R2 is a value that is higher than zero and that is lower than 1000 rpm.

The torque value generated by the electric drive motor 220 is approximately proportional to the current value flowing in the electric drive motor 220. Accordingly, conversion of the torque value shown in FIG. 4 into the current value flowing in the electric drive motor 220 provides similar waveforms.

The current flowing in the electric drive motor 220 is alternating current that is converted from direct current by the motor inverter 150. The current value flowing in the electric drive motor 220 denotes an effective value. The current value of direct current flowing in the motor inverter 150 has a positive correlation with the current value flowing in the electric drive motor 220. Moreover, the current value of direct current flowing in the motor inverter 150 is approximately proportional to the current value flowing in the electric drive motor 220.

The following describes relationships of the current value flowing in the motor inverter 150, in place of the current value flowing in the electric drive motor 220, to the depression amount of the accelerator pedal and to the torque generated by the electric drive motor 220. In the description below, the current value means the current value of direct current flowing in the motor inverter 150, unless otherwise specified.

FIG. 5 is a graph showing relationships of the current value to the depression amount of the accelerator pedal. FIG. 5 shows the relationships with regard to the rotation speed of zero and a second rotation speed R2. The second rotation speed R2 is equal to the second rotation speed R2 shown in FIG. 4.

With regard to the second rotation speed R2, the torque is specified to monotonically increase with an increase in depression amount as shown in FIG. 4. Accordingly, the current value also monotonically increases with an increase in depression amount as shown in FIG. 5. With regard to the second rotation speed R2, the current value reaches a current value Imax at the depression amount of 100%. The current value Imax denotes a current value that generates the torque TRQmax.

With regard to the rotation speed of zero, the current value is specified to monotonically increase with an increase in depression amount in a range of the depression amount from 0% to a predetermined amount P2, as in the case of the second rotation speed R2. For example, the current value is a current value I1 at a depression amount P1 and is a limit value Ith at a depression amount equal to the predetermined amount P2. The depression amount P1 is smaller than the predetermined amount P2. The current value I1 is lower than the limit value Ith.

With regard to the rotation speed of zero, the current value is kept constant at the limit value Ith irrespective of the depression amount in a range of the depression amount from the predetermined amount P2 to 100%. This aims to keep the torque value constant at the torque TRQth when the depression amount is equal to or larger than the predetermined amount P2 with regard to the rotation speed of zero, as described above with reference to FIG. 4. The limit value Ith denotes a current value that generates the torque TRQth.

According to the embodiment, the limit value Ith is 50% of the current value Imax, and the torque TRQth is 50% of the torque TRQmax.

As described above, when the rotation speed is zero, the current value is limited to be not higher than the limit value Ith, irrespective of the depression amount.

Figure 6:
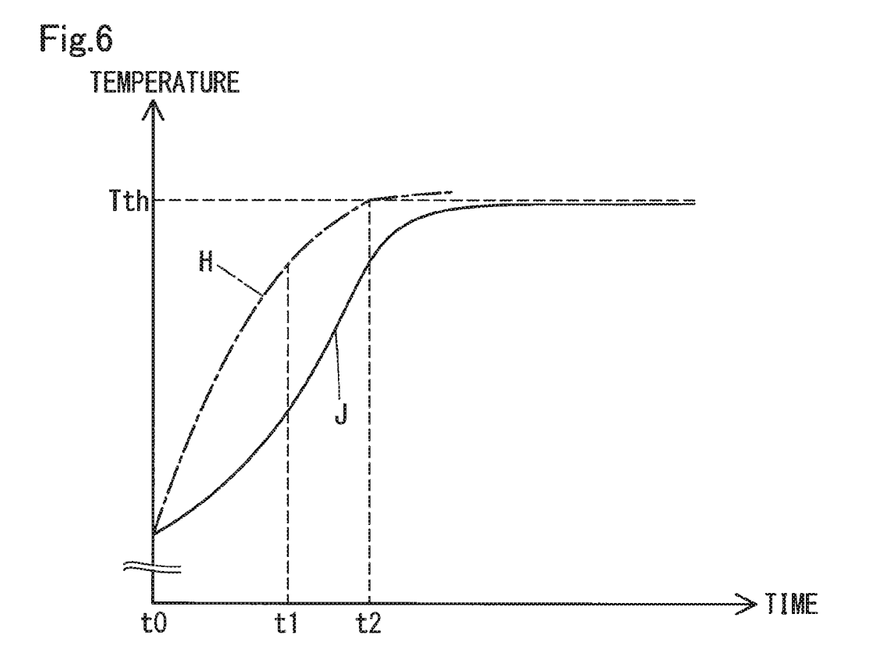
FIG. 6 is a graph showing a time change in temperature of a switching element in a stationary phase.

FIG. 6 is a graph showing a time change in temperature of a switching element in a stationary phase. FIG. 6 shows the values obtained by experiment. In the description below, the temperature means the temperature of the switching element in the stationary phase. FIG. 6 shows a curve J of the embodiment and a curve H of a comparative example. In the comparative example, the current flowing in the electric drive motor 220 is not limited even when the rotation speed is zero. For example, when the depression amount is 100%, the current flows in the electric drive motor 220 to output the torque TRQmax even at the rotation speed of zero.

At a time t0, the depression amount starts becoming larger than the predetermined amount P2 when the rotation speed is zero. More specifically, at the time t0, the depression amount increases from a value smaller than the predetermined amount P2 to 100%. The rotation speed of zero is kept during a time period shown in the graph. Keeping the rotation speed of zero even at the depression amount of 100% is not attributed to a failure but is attributed to an insufficiency of torque that does not allow the truck 10 to move forward. The state of torque insufficiency is, for example, the state that the trailer 19 with a full cargo is riding over a large bump.

According to the comparative example, the temperature abruptly increases from the time t0 to a time t1. There is only a short time period from the time t0 to the time t1. The control unit 160 accordingly fails to detect the state that the current flowing in the electric drive motor 220 is to be limited, based on the measurement values of the temperature sensor 151.

At the time t1, the control unit 160 detects the state that the current flowing in the electric drive motor 220 is to be limited and starts feedback control to limit the current. The start of such limitation, however, fails to sufficiently suppress a temperature rise, and the temperature reaches a threshold value Tth. In response to detection of the temperature rise to the threshold value Tth, the control unit 160 decreases the current supplied to the electric drive motor 220 to zero. As a result, the torque generated by the electric drive motor 220 becomes zero.

According to the embodiment, on the other hand, the temperature increases from the time t0 to the time t1 but has a lower rate of temperature rise compared with the comparative example. This is because the current flowing in the electric drive motor 220 is limited by determining the torque according to the map shown in FIG. 4 even when the depression amount is 100%.

At the time t1, the control unit 160 detects the state that the current flowing in the electric drive motor 220 is to be limited and starts the feedback control described above. According to the embodiment, the feedback control suppresses the temperature rise to be lower than the threshold value Tth by the feedback control, because of the lower rate of temperature rise from the time t0 to the time t1. This accordingly prevents the current supplied to the electric drive motor 220 from becoming zero.

The technique of the embodiment reduces the possibility of activating the control to decrease the torque to zero in spite of the driver's strong depression of the accelerator pedal when the rotation speed of the electric drive motor 220 is zero.

Additionally, the technique of the embodiment does not need the value of vehicle weight and ensures the above advantageous effect without being affected by a change in vehicle weight according to the amount of cargo loaded on the trailer 19.

Embodiment 2 is described below. The description of Embodiment 2 mainly regards the configuration different from that of Embodiment 1. The configuration that is not specifically described below is similar to that of Embodiment 1.

Figure 7:
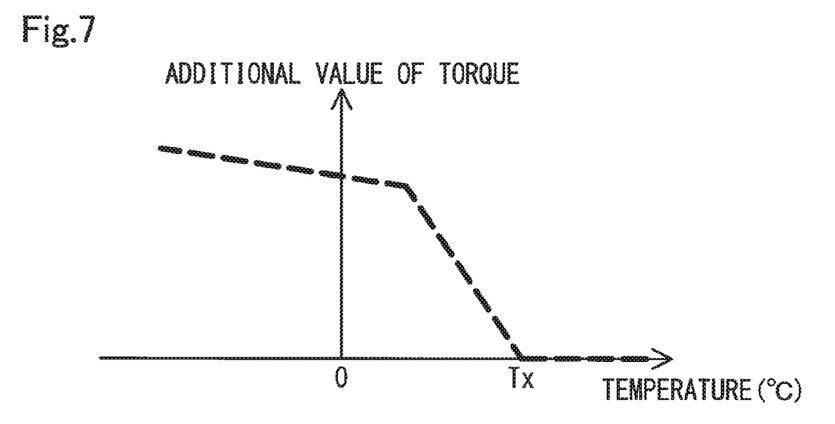
FIG. 7 is a graph showing a relationship of an additional value of torque to the temperature of the switching element in the stationary phase.

FIG. 7 is a graph showing a relationship of an additional value of torque to the temperature of the switching element in the stationary phase. According to this embodiment, the torque is determined by referring to the map shown in FIG. 4 and the relationship shown in FIG. 7. More specifically, the torque is set to a total value of a value determined according to the map shown in FIG. 4 and an additional value determined according to the relationship shown in FIG. 7.

As shown in FIG. 7, the additional value of torque depends on the temperature. The additional value of torque is zero when the temperature is equal to or higher than a temperature Tx. This means that the torque is practically equal to the torque according to Embodiment 1 when the temperature is equal to or higher than the temperature Tx. When the temperature is lower than the temperature Tx, the additional value of torque is a positive value that changes depending on the temperature. Basically, the additional value of torque monotonically increases with a decrease in temperature.

Such addition of torque at the temperature of lower than the temperature Tx practically increases the limit value Ith.

The technique of the embodiment relaxes the limitation of torque when the switching element in the stationary phase has a low temperature.

The temperature of the switching element in the stationary phase changes every moment. The temperatures at various timings may thus be employed for the temperature shown in FIG. 7. For example, the momently changing temperature may be employed to change the additional value of torque every moment. In another example, the temperature at the time when the depression amount reaches the predetermined amount P2 may be employed to provide a fixed additional value of torque. Such fixation of the additional value of torque may be cancelled at any timing. For example, fixation of the additional value of torque may be cancelled when the depression amount becomes smaller than the predetermined amount P2.

Embodiment 3 is described below. The description of Embodiment 3 mainly regards the configuration different from that of Embodiment 1. The configuration that is not specifically described below is similar to that of Embodiment 1.

Figure 8:
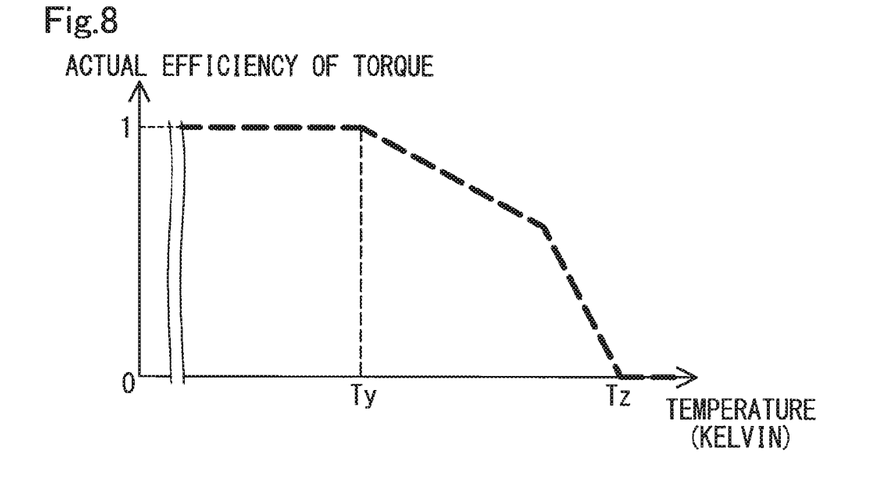
FIG. 8 is a graph showing a relationship of an actual efficiency of torque to the temperature of the switching element in the stationary phase.

FIG. 8 is a graph showing a relationship of an actual efficiency of torque to the temperature of the switching element in the stationary phase. According to this embodiment, the torque is determined by referring to the map shown in FIG. 4 and the relationship shown in FIG. 8. More specifically, the torque is set by multiplying a value determined according to the map shown in FIG. 4 by an actual efficiency determined according to the relationship shown in FIG. 8.

The actual efficiency of torque depends on the temperature as shown in FIG. 8. The actual efficiency of torque is 1 when the temperature is equal to or lower than a temperature Ty. This means that the torque is practically equal to the torque according to Embodiment 1 when the temperature is equal to or lower than the temperature Ty. The actual efficiency of torque starts decreasing when the temperature becomes higher than the temperature Ty. The actual efficiency of torque is zero when the temperature is equal to or higher than a temperature Tz. This means that the torque is zero when the temperature is equal to or higher than the temperature Tz. Such multiplication of torque by the actual efficiency at the temperature higher than the temperature Ty practically decreases the limit value Ith.

The temperature Tz may be the same temperature as or may be a different temperature from the threshold value Tth shown in FIG. 6. The timing when the temperature of the switching element in the stationary phase is employed is described above in Embodiment 2.

The technique of the embodiment relaxes the limitation of torque when the switching element in the stationary phase has a low temperature.

The disclosure is not limited to any of the aspects and the embodiments described above but may be implemented by a diversity of other configurations without departing from the scope of the disclosure. For example, the technical features of any of the aspects and the embodiments corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential herein. Some examples of the other configurations are given below.

The truck is not limited to the configuration pulling a trailer but may be, for example, a full trailer or a dump truck.

The predetermined ratio may be any value in a range of not lower than 50% and lower than 100%. The predetermined ratio is a value obtained by dividing the limit value Ith by the current value Imax. The predetermined ratio may be, for example, 60%. Increasing the predetermined ratio increases the torque that is generable when the rotation speed is zero. In the case of increasing the predetermined ratio, it is preferable to prevent overheating of the switching element by, for example, enhancing the cooling capacity of the cooling device 290. Decreasing the predetermined ratio further suppress heat generation of the switching element and thereby increases the degree of protection of the switching element.

The current value may not be fixed to the limit value Ith in the range of the depression amount from the predetermined amount P2 to 100%. For example, the current value may be a slightly lower current value than the limit value Ith at the depression amount equal to the predetermined amount P2. The current value may gradually increase with an increase in depression amount toward 100%. The current value may be set equal to the limit value Ith when the depression amount reaches 100%.

The truck is not limited to the fuel cell vehicle but may be an electric vehicle configured such that a secondary battery is charged from a commercial electric power supply or may be a vehicle configured such that electric power generated by the power of an internal combustion engine is supplied to a electric drive motor.

The truck may be a connected car. The connected car denotes an electric motor vehicle equipped with a communication device to receive services by communication with cloud services.

What is claimed is:

1. A truck, comprising:
an electric drive motor for driving;

an inverter including a plurality of switching elements configured to apply alternating current flow into the electric drive motor;
an accelerator pedal configured to control a current value flowing into the electric drive motor; and
a control unit configured to control a current value flowing into the inverter according to a depression amount of the accelerator pedal and a rotation speed of the electric drive motor, wherein
the control unit is configured to, when the rotation speed of the electric drive motor is zero, control the current value flowing into the inverter to be equal to or lower than a limit value obtained by multiplying a predetermined maximum value by a predetermined ratio that is any value in a range of not lower than 50% and lower than 100%, the predetermined maximum value corresponding to a current value when the depression amount of the accelerator pedal is 100%.

2. A truck, comprising:
an electric drive motor for driving;
an inverter including a plurality of switching elements configured to apply alternating current flow into the electric drive motor;
an accelerator pedal configured to control a current value flowing into the electric drive motor; and
a control unit configured to control a current value flowing into the inverter according to a depression amount of the accelerator pedal and a rotation speed of the electric drive motor, wherein
the control unit is configured to, when the depression amount is 100%, control the current value flowing into the inverter to a predetermined maximum value when the rotation speed is equal to a first rotation speed that is lower than zero or the rotation speed is equal to a second rotation speed that is higher than zero, while controlling the current value flowing into the inverter to a limit value obtained by multiplying the predetermined maximum value by a predetermined ratio that is any value in a range of not lower than 50% and lower than 100% when the rotation speed is equal to zero, the predetermined maximum value corresponding to a current value when the depression amount of the accelerator pedal is 100%.

3. The truck according to claim 1, further comprising a temperature sensor configured to determine temperature of a switching element of the plurality of switching elements,
wherein the control unit is configured to set the predetermined ratio to a first value when the temperature of the switching element is a first temperature, while setting the predetermined ratio to a second value that is larger than the first value when the temperature of the switching element is a second temperature that is lower than the first temperature.

4. The truck according to claim 2, further comprising a temperature sensor configured to determine temperature of a switching element of the plurality of switching elements,
wherein the control unit is configured to set the predetermined ratio to a first value when the temperature of the switching element is a first temperature, while setting the predetermined ratio to a second value that is larger than the first value when the temperature of the switching element is a second temperature that is lower than the first temperature.

5. The truck according to claim 1,
wherein the control unit is configured to, when the rotation speed is zero, cause the current value flowing into the inverter to be equal to the limit value when the depression amount is equal to or larger than a predetermined amount.

6. The truck according to claim 2,
wherein the control unit is configured to, when the rotation speed is zero, cause the current value flowing into the inverter to be equal to the limit value when the depression amount is equal to or larger than a predetermined amount.

7. The truck according to claim 3,
wherein the control unit is configured to, when the rotation speed is zero, cause the current value flowing into the inverter to be equal to the limit value when the depression amount is equal to or larger than a predetermined amount.

8. The truck according to claim 4,
wherein the control unit is configured to, when the rotation speed is zero, cause the current value flowing into the inverter to be equal to the limit value when the depression amount is equal to or larger than a predetermined amount.

9. A truck, comprising:
an electric drive motor for driving;
an inverter including a plurality of switching elements configured to apply alternating current flow into the electric drive motor;
an accelerator pedal configured to control a current value flowing into the electric drive motor; and
a control unit configured to control a current value flowing into the inverter according to a depression amount of the accelerator pedal and a rotation speed of the electric drive motor, wherein
the control unit is configured to, when the rotation speed is zero, control the current value flowing into the inverter to a first value when the depression amount is equal to a first amount, while controlling the current value flowing into the inverter to a second value that is larger than the first value when the depression amount is equal to a second amount that is larger than the first amount or when the depression amount is equal to a third amount that is larger than the second amount.

10. A method of controlling an electric drive motor for driving mounted on a truck, comprising:
acquiring a depression amount of an accelerator pedal, wherein the accelerator pedal is configured to control a current value flowing into the electric drive motor;
acquiring a rotation speed of the electric drive motor;
when the rotation speed of the electric drive motor is zero, controlling the current value flowing into an inverter to be equal to or lower than a limit value obtained by multiplying a predetermined maximum value by a predetermined ratio that is any value in a range of not lower than 50% and lower than 100%, the predetermined maximum value corresponding to a current value when the depression amount of the accelerator pedal is 100%.

11. A method of controlling an electric drive motor for driving mounted on a truck, comprising:
acquiring a depression amount of an accelerator pedal, wherein the accelerator pedal is configured to control a current value flowing into the electric drive motor;
acquiring a rotation speed of the electric drive motor;
when the depression amount is 100%, controlling the current value flowing into an inverter to a predetermined maximum value at the rotation speed equal to a first rotation speed that is lower than zero and at the rotation speed equal to a second rotation speed that is higher than zero, controlling the current value flowing into the inverter to a limit value obtained by multiplying the predetermined maximum value by a predetermined ratio that is any value in a range of not lower than 50% and lower than 100%, the predetermined maximum value corresponding to a current value when the depression amount of the accelerator pedal is 100%.

12. A method of controlling an electric drive motor for driving mounted on a truck, comprising:

acquiring a depression amount of an accelerator pedal, wherein the accelerator pedal configured to control a current value flowing into the electric drive motor;

acquiring a rotation speed of the electric drive motor;

when the rotation speed is zero, controlling the current value flowing into an inverter to a first value at the depression amount equal to a first amount, and controlling the current value flowing into the inverter to a second value that is larger than the first value at the depression amount equal to a second amount that is larger than the first amount and at the depression amount equal to a third amount that is larger than the second amount.

* * * * *